US009052378B2

(12) United States Patent
Alizadeh-Shabdiz et al.

(10) Patent No.: US 9,052,378 B2
(45) Date of Patent: *Jun. 9, 2015

(54) ESTIMATION OF POSITION USING WLAN ACCESS POINT RADIO PROPAGATION CHARACTERISTICS IN A WLAN POSITIONING SYSTEM

(75) Inventors: Farshid Alizadeh-Shabdiz, Wayland, MA (US); Kaveh Pahlavan, Newton, MA (US)

(73) Assignee: Skyhook Wireless, Inc., Boston, MA (US)

(\*) Notice: Subject to any disclaimer, the term of this patent is extended or adjusted under 35 U.S.C. 154(b) by 0 days.

This patent is subject to a terminal disclaimer.

(21) Appl. No.: 13/443,482

(22) Filed: Apr. 10, 2012

(65) Prior Publication Data

US 2012/0196621 A1 Aug. 2, 2012

Related U.S. Application Data

(63) Continuation of application No. 13/047,253, filed on Mar. 14, 2011, now Pat. No. 8,155,673, which is a continuation of application No. 12/392,621, filed on Feb. 25, 2009, now Pat. No. 7,916,661, which is a continuation of application No. 11/430,222, filed on May 8, 2006, now Pat. No. 7,515,578.

(51) Int. Cl.
*H04W 24/00* (2009.01)
*G01S 5/02* (2010.01)
(Continued)

(52) U.S. Cl.
CPC ............... *G01S 5/0252* (2013.01); *G01S 11/06* (2013.01); *H04W 64/00* (2013.01)

(58) Field of Classification Search
USPC ............ 455/416, 456.5, 456.1, 411; 370/252, 370/350, 329, 330, 336, 331, 338, 216, 401, 370/340, 315
See application file for complete search history.

(56) References Cited

U.S. PATENT DOCUMENTS 6,421,330 B1 7/2002 Chung et al.
6,853,847 B2 2/2005 Shioda et al.
(Continued)

FOREIGN PATENT DOCUMENTS

EP 1612999 A1 1/2006
JP 09-074585 3/1997
(Continued)

OTHER PUBLICATIONS

"Terminal Equipment and Protocols for Telematic Services: Information Technology—Digital Compression and Coding of Continuous-Tome Still Images—Requirements and Guidelines," International Telecommunication Union, Sep. 1992.

(Continued)

*Primary Examiner* — Kiet Doan
(74) *Attorney, Agent, or Firm* — Cesari and McKenna, LLP

(57) ABSTRACT

A method for estimating position using WLAN access point radio propagation characteristics in a WLAN location based service is provided. A location-based services system has a plurality of Wi-Fi access points in a target area. The Wi-Fi access points are positioned at geographic locations and have signal coverage areas. A method of characterizing at least one of the Wi-Fi access points comprises determining the geographic location of the Wi-Fi access point, dividing the signal coverage area of the Wi-Fi access point into at least one section, and determining radio propagation characteristics for each section. The radio propagation characteristics of each section characterize a radio channel of the Wi-Fi access point, and the characterization can be used in a location algorithm.

23 Claims, 6 Drawing Sheets

(51) Int. Cl.
*G01S 11/06* (2006.01)
*H04W 64/00* (2009.01)

(56) References Cited

U.S. PATENT DOCUMENTS

| | | | |
|---|---|---|---|
| 6,888,811 B2 | 5/2005 | Eaton et al. | |
| 7,123,928 B2 | 10/2006 | Moeglein et al. | |
| 7,305,245 B2 | 12/2007 | Alizadeh-Shabdiz et al. | |
| 7,397,424 B2 | 7/2008 | Houri | |
| 7,403,762 B2 | 7/2008 | Morgan et al. | |
| 7,414,988 B2 | 8/2008 | Jones et al. | |
| 7,433,694 B2 | 10/2008 | Morgan et al. | |
| 7,433,696 B2 | 10/2008 | Dietrich et al. | |
| 7,471,954 B2 | 12/2008 | Brachet et al. | |
| 7,474,646 B2 | 1/2009 | Tamaki | |
| 7,474,897 B2 | 1/2009 | Morgan et al. | |
| 7,493,127 B2 | 2/2009 | Morgan et al. | |
| 7,502,620 B2 | 3/2009 | Morgan et al. | |
| 7,515,578 B2 | 4/2009 | Alizadeh-Shabdiz et al. | |
| 7,551,579 B2 | 6/2009 | Alizadeh-Shabdiz et al. | |
| 7,551,929 B2 | 6/2009 | Alizadeh-Shabdiz et al. | |
| 7,768,963 B2 | 8/2010 | Alizadeh-Shabdiz | |
| 7,769,396 B2 | 8/2010 | Alizadeh-Shabdiz et al. | |
| 7,818,017 B2 | 10/2010 | Alizadeh-Shabdiz et al. | |
| 7,835,754 B2 | 11/2010 | Alizadeh-Shabdiz et al. | |
| 7,856,234 B2 | 12/2010 | Alizadeh-Shabdiz et al. | |
| 7,916,661 B2 | 3/2011 | Alizadeh-Shabdiz et al. | |
| 7,999,742 B2 | 8/2011 | Alizadeh-Shabdiz | |
| 8,014,788 B2 | 9/2011 | Alizadeh-Shabdiz et al. | |
| 8,019,357 B2 | 9/2011 | Alizadeh-Shabdiz et al. | |
| 8,022,877 B2 | 9/2011 | Alizadeh-Shabdiz | |
| 8,054,219 B2 | 11/2011 | Alizadeh-Shabdiz | |
| 8,063,820 B2 | 11/2011 | Alizadeh-Shabdiz | |
| 8,090,386 B2 | 1/2012 | Alizadeh-Shabdiz et al. | |
| 8,103,288 B2 | 1/2012 | Alizadeh-Shabdiz et al. | |
| 8,116,285 B1* | 2/2012 | Barnum | 370/338 |
| 8,130,148 B2 | 3/2012 | Alizadeh-Shabdiz | |
| 8,144,673 B2 | 3/2012 | Alizadeh-Shabdiz | |
| 8,154,454 B2 | 4/2012 | Alizadeh-Shabdiz | |
| 8,155,666 B2 | 4/2012 | Alizadeh-Shabdiz | |
| 8,155,673 B2 | 4/2012 | Alizadeh-Shabdiz et al. | |
| 2001/0038356 A1* | 11/2001 | Frank | 343/853 |
| 2002/0108371 A1 | 8/2002 | Rouse et al. | |
| 2003/0118015 A1 | 6/2003 | Gunnarsson et al. | |
| 2003/0218570 A1 | 11/2003 | Moore et al. | |
| 2004/0057408 A1 | 3/2004 | Gray | |
| 2004/0203880 A1 | 10/2004 | Riley | |
| 2004/0203904 A1 | 10/2004 | Gwon et al. | |
| 2005/0003827 A1 | 1/2005 | Whelan | |
| 2005/0037775 A1 | 2/2005 | Moeglein et al. | |
| 2005/0073980 A1 | 4/2005 | Thomson et al. | |
| 2005/0107953 A1 | 5/2005 | Sugla | |
| 2005/0192024 A1 | 9/2005 | Sheynblat | |
| 2005/0208919 A1 | 9/2005 | Walker et al. | |
| 2006/0009235 A1 | 1/2006 | Sheynblat et al. | |
| 2006/0072502 A1 | 4/2006 | Crandall et al. | |
| 2006/0095348 A1 | 5/2006 | Jones et al. | |
| 2006/0153138 A1* | 7/2006 | Asoh et al. | 370/332 |
| 2006/0197704 A1 | 9/2006 | Luzzatto et al. | |
| 2006/0229088 A1 | 10/2006 | Walter | |
| 2006/0281412 A1* | 12/2006 | Skafidas et al. | 455/63.1 |
| 2007/0004428 A1 | 1/2007 | Morgan et al. | |
| 2007/0018891 A1 | 1/2007 | Golden et al. | |
| 2007/0121560 A1 | 5/2007 | Edge | |
| 2007/0126635 A1 | 6/2007 | Houri | |
| 2007/0150516 A1 | 6/2007 | Morgan et al. | |
| 2008/0008118 A1 | 1/2008 | Alizadeh-Shabdiz | |
| 2008/0008119 A1 | 1/2008 | Alizadeh-Shabdiz | |
| 2008/0008121 A1 | 1/2008 | Alizadeh-Shabdiz | |
| 2008/0033646 A1 | 2/2008 | Morgan et al. | |
| 2008/0108319 A1 | 5/2008 | Gallagher | |
| 2008/0176583 A1 | 7/2008 | Brachet et al. | |
| 2008/0248741 A1 | 10/2008 | Alizadeh-Shabdiz | |
| 2008/0248808 A1 | 10/2008 | Alizadeh-Shabdiz | |
| 2009/0075672 A1 | 3/2009 | Jones et al. | |
| 2009/0149197 A1 | 6/2009 | Morgan et al. |
| 2009/0175189 A1 | 7/2009 | Alizadeh-Shabdiz et al. |
| 2009/0303112 A1 | 12/2009 | Alizadeh-Shabdiz |
| 2009/0303113 A1 | 12/2009 | Alizadeh-Shabdiz |
| 2009/0303114 A1 | 12/2009 | Alizadeh-Shabdiz |
| 2009/0303115 A1 | 12/2009 | Alizadeh-Shabdiz |
| 2009/0303119 A1 | 12/2009 | Alizadeh-Shabdiz |
| 2009/0310585 A1 | 12/2009 | Alizadeh-Shabdiz |
| 2009/0312036 A1 | 12/2009 | Alizadeh-Shabdiz |
| 2010/0052983 A1 | 3/2010 | Alizadeh-Shabdiz |
| 2011/0021207 A1 | 1/2011 | Morgan et al. |
| 2011/0035420 A1 | 2/2011 | Alizadeh-Shabdiz et al. |
| 2011/0045840 A1 | 2/2011 | Alizadeh-Shabdiz et al. |
| 2011/0074626 A1 | 3/2011 | Alizadeh-Shabdiz et al. |
| 2011/0080317 A1 | 4/2011 | Alizadeh-Shabdiz et al. |
| 2011/0080318 A1 | 4/2011 | Alizadeh-Shabdiz et al. |
| 2011/0235532 A1 | 9/2011 | Alizadeh-Shabdiz et al. |
| 2011/0235623 A1 | 9/2011 | Alizadeh-Shabdiz et al. |
| 2011/0287783 A1 | 11/2011 | Alizadeh-Shabdiz et al. |
| 2011/0298660 A1 | 12/2011 | Alizadeh-Shabdiz |
| 2011/0298663 A1 | 12/2011 | Alizadeh-Shabdiz |
| 2011/0298664 A1 | 12/2011 | Alizadeh-Shabdiz |
| 2011/0306357 A1 | 12/2011 | Alizadeh-Shabdiz et al. |
| 2011/0306358 A1 | 12/2011 | Alizadeh-Shabdiz et al. |
| 2011/0306359 A1 | 12/2011 | Alizadeh-Shabdiz et al. |
| 2011/0306360 A1 | 12/2011 | Alizadeh-Shabdiz et al. |
| 2011/0306361 A1 | 12/2011 | Alizadeh-Shabdiz et al. |
| 2012/0100872 A1 | 4/2012 | Alizadeh-Shabdiz et al. |
| 2012/0108260 A1 | 5/2012 | Alizadeh-Shabdiz |
| 2012/0112958 A1 | 5/2012 | Alizadeh-Shabdiz et al. |
| 2012/0196621 A1 | 8/2012 | Alizadeh-Shabdiz et al. |
| 2012/0280866 A1 | 11/2012 | Alizadeh-Shabdiz |
| 2012/0309420 A1 | 12/2012 | Morgan et al. |
| 2013/0072227 A1 | 3/2013 | Morgan et al. |

FOREIGN PATENT DOCUMENTS

| | | |
|---|---|---|
| JP | 2002-057614 | 2/2002 |
| JP | 2003-329757 | 11/2003 |
| JP | 2004-112482 | 4/2004 |
| WO | WO-03/102620 A1 | 12/2003 |
| WO | WO-2004/016032 A1 | 2/2004 |
| WO | WO-2004/036240 A2 | 4/2004 |
| WO | WO-2005/121829 A1 | 12/2005 |
| WO | WO-2006/070211 A1 | 7/2006 |
| WO | WO-2006/110181 A2 | 10/2006 |
| WO | WO-2006/117587 A1 | 11/2006 |
| WO | WO-2007/133967 | 11/2007 |
| WO | WO-2007/133968 | 11/2007 |
| WO | WO-2008/057737 | 5/2008 |
| WO | WO-2011/011201 | 1/2011 |

OTHER PUBLICATIONS

Chan, et al., "Collaborative Localization: Enhancing WiFi-Based Position Estimation with Neighborhood Links in Clusters," May 2006, 18 pages.

European Search Report for Application No. 11190959 dated Jan. 23, 2012, 3 pages.

European Search Report for European Application No. 07868513, dated Jun. 7, 2010, 5 pages.

Griswold et al., "ActiveCampus—Sustaining Educational Communities through Mobile Technology." UCSD CSE Technical Report #CS200-0714, 2002, 19 pages.

Hazas, M., et al., "Location-Aware Computing Comes of Age," IEEE, vol. 37, Feb. 2004, pp. 95-97.

Hellebrandt, M., et al., "Estimating Position and Velocity of Mobile in a Cellular Radio Network," IEEE Transactions on Vehicular Technology, vol. 46, No. 1, Feb. 1997, pp. 65-71.

Hightower, et al., "Particle Filters for Location Estimation in Ubiquitous Computing: A Case Study," Sep. 2004, 18 pages.

International Search Report and Written Opinion of the International Searching Authority, the United States Patent and Trademark Office, for International Application No. PCT/US2007/068251, mailing date of Aug. 25, 2008, 6 pages.

International Search Report and Written Opinion of the International Searching Authority, the United States Patent and Trademark Office,

(56) References Cited

OTHER PUBLICATIONS for International Application No. PCT/US2010/041279, mailing date of Sep. 1, 2010, 7 pages.

International Search Report and Written Opinion, International Patent Application No. PCT/US07/68248, mailed Aug. 6, 2008, 6 pages.

International Search Report, International Patent Application No. PCT/US07/81929, mailed Apr. 16, 2008, 2 pages.

Kawabata, K. et al., "Estimating Velocity Using Diversity Reception," IEEE, 1994, pp. 371-374.

Kim, M., et al., "Risks of using AP locations discovered through war driving,"; Pervasive Computing, May 19, 2006, pp. 67-81.

Kirsner, S., "One more way to find yourself," The Boston Globe, May 23, 2005, Retrieved from www.boston.com, 2 pages.

Krumm, J., et al., "LOCADIO: Inferring Motion and Location from Wi-Fi Signal Strengths," First Annual International Conference on Mobile and Ubiquitous Systems: Networking and Services, Aug. 2004.

Kwan, M., "Graphic Programming Using Odd or Even Points," Chinese Math. 1, 1960, pp. 273-277.

LaMarca, A., et al., "Place Lab: Device Positioning Using Radio Beacons in the Wild,"; Pervasive Computing, Oct. 2004, pp. 116-133.

Muthukrishnan, K., et al., "Towards Smart Surroundings: Enabling Techniques and Technologies for Localization," Lecture Notes in Computer Science, vol. 3479, May 2005, 11 pages.

Supplemental European Search Report and Written Opinion for EP07783288 dated Jun. 3, 2010, 7 pages.

Supplementary European Search Report and Written Opinion for EP07761894, dated Jun. 3, 2010, 8 pages.

Weisstein, Eric W., "Chinese Postman Problem," Mathworld—A Wolfman Web Resource, retrieved from http://mathworld.wolfram.com/ChinesePostmanProblem.html, 2010, 1 page.

"Delta Encoding," Wikipedia, retrieved from <http://en.wikipedia.org/wiki/Delta_encoding>, on Mar. 1, 2006, pp. 1-5.

* cited by examiner

US 9,052,378 B2

ESTIMATION OF POSITION USING WLAN ACCESS POINT RADIO PROPAGATION CHARACTERISTICS IN A WLAN POSITIONING SYSTEM

CROSS-REFERENCE TO RELATED APPLICATIONS

This application is a continuation of and claims priority under 35 U.S.C. §120 to U.S. patent application Ser. No. 13/047,253, filed on Mar. 14, 2011, entitled Estimation of Position Using WLAN Access Point Radio Propagation Characteristics in a WLAN Positioning System, now U.S. Pat. No. 8,155,673, which is a continuation of U.S. patent application Ser. No. 12/392,621, filed on Feb. 25, 2009, entitled Estimation of Position Using WLAN Access Point Radio Propagation Characteristics in a WLAN Positioning System, now U.S. Pat. No. 7,916,661, which is a continuation of U.S. patent application Ser. No. 11/430,222, filed on May 8, 2006, entitled Estimation of Position Using WLAN Access Point Radio Propagation Characteristics in a WLAN Positioning System, now U.S. Pat. No. 7,515,578, the contents of each of which are incorporated herein by reference.

This application is related to the following U.S. Patent Applications:

U.S. patent application Ser. No. 11/430,079, filed May 8, 2006 and entitled "Estimation of Speed and Direction of Travel In A WLAN Positioning System", now U.S. Pat. No. 7,835,754;

U.S. patent application Ser. No. 11/429,862, filed May 8, 2006 and entitled "Estimation of Speed of Travel Using the Dynamic Signal Strength Variation of Multiple WLAN Access Points", now U.S. Pat. No. 8,014,788;

U.S. patent application Ser. No. 11/430,064, filed May 8, 2006 and entitled "Estimation of Speed and Direction of Travel In a WLAN Positioning System Using Multiple Position Estimations", now U.S. Pat. No. 7,551,929; and U.S. patent application Ser. No. 11/430,224, filed May 8, 2006 and entitled "Calculation of Quality of WLAN Access Point Characterization For Use in a WLAN Positioning System", now U.S. Pat. No. 7,551,579, the contents of each of which are hereby incorporated by reference.

BACKGROUND

1. Field of the Invention

The invention generally relates to positioning systems and, more specifically, to methods and systems of estimating attributes of user movement (e.g., position, speed, and direction) using WLAN access point radio propagation characteristics in a WLAN positioning system.

2. Discussion of Related Art

Position determination is the main component of navigation systems and any Location Based Services (LBS). Proliferation of WLAN access points in recent years created a blanket of WLAN radio waves everywhere. Therefore, almost in any place, there is a great possibility of detecting WLAN radio waves, especially in urban areas. The exponential growth of WLAN, and the fact that they can be found almost everywhere, initiated an idea of leveraging them for a metropolitan positioning system for indoor and outdoor areas. In a metropolitan WLAN positioning system, location of WLAN access points are used as reference points, and the Received Signal Strength (RSS) of a WLAN access point is used as an indicator of a distance of an end user from the WLAN access points that the user detects at any time. By knowing the distance of the end user from WLAN access points, location of the end user can be determined. Translating receiver Receive Signal Strength to distance relies on assuming a specific radio channel model. Ideally, if the radio channel model was exactly known, the exact distance of the end user to WLAN access points could be found.

Outdoor and indoor WLAN based positioning systems have been explored by couple of research labs, but none of them included speed and bearing estimation in their system. The most important research efforts in this area have been conducted by PlaceLab (www.placelab.com, a project sponsored by Microsoft and Intel), University of California San Diego ActiveCampus project (ActiveCampus—Sustaining Educational Communities through Mobile Technology, technical report #CS2002-0714), and the MIT campus wide location system, and it was evaluated through several small projects at Dartmouth college (e.g., M. Kim, J. J. Fielding, and D. Kotz, "Risks of using AP locations discovered through war driving").

There have been a number of commercial offerings of Wi-Fi location systems targeted at indoor positioning. (See, e.g., Kavitha Muthukrishnan, Maria Lijding, Paul Havinga, Towards Smart Surroundings: Enabling Techniques and Technologies for Localization, *Proceedings of the International Workshop on Location and Context-Awareness* (*LoCA* 2005) at Pervasive 2005, May 2005, and Hazas, M., Scott, J., Krumm, J.: Location-Aware Computing Comes of Age. IEEE Computer, 37(2):95-97, February 2004 005, Pa005, Pages 350-362.) These systems are designed to address asset and people tracking within a controlled environment like a corporate campus, a hospital facility or a shipping yard. The classic example is having a system that can monitor the exact location of the crash cart within the hospital so that when there is a cardiac arrest the hospital staff doesn't waste time locating the device. The accuracy requirements for these use cases are very demanding typically calling for 1-3 meter accuracy.

These systems use a variety of techniques to fine tune their accuracy including conducting detailed site surveys of every square foot of the campus to measure radio signal propagation. They also require a constant network connection so that the access point and the client radio can exchange synchronization information similar to how A-GPS works. While these systems are becoming more reliable for indoor use cases, they are ineffective in any wide-area deployment. It is impossible to conduct the kind of detailed site survey required across an entire city and there is no way to rely on a constant communication channel with 802.11 access points across an entire metropolitan area to the extent required by these systems. Most importantly outdoor radio propagation is fundamentally different than indoor radio propagation rendering these indoor positioning algorithms almost useless in a wide-area scenario. The required accuracy of indoor WLAN based positioning systems, makes it hard to use radio channel modeling and it is considered as a research topic in that domain. In addition, none of the WLAN based positioning systems to date have distinguished between access points, and current methods treat all WLAN access points the same.

FIG. 1 depicts a Wi-Fi positioning system (WPS). The positioning system includes positioning software [103] that resides on a computing device [101]. Throughout a particular coverage area there are fixed wireless access points [102] that broadcast information using control/common channel broadcast signals. The client device monitors the broadcast signal or requests its transmission via a probe request. Each access point contains a unique hardware identifier known as a MAC address. The client positioning software receives signal beacons from the 802.11 access points in range and calculates the geographic location of the computing device using characteristics from the signal beacons. Those characteristics include the unique identifier of the 802.11 access point, known as the MAC address, and the strengths of the signal reaching the client device. The client software compares the observed 802.11 access points with those in its reference database [104] of access points, which may or may not reside on the device as well. The reference database contains the calculated geographic locations and power profile of all the access points the gathering system has collected. The power profile may be generated from a collection of readings that represent the power of the signal from various locations. Using these known locations, the client software calculates the relative position of the user device [101] and determines its geographic coordinates in the form of latitude and longitude readings. Those readings are then fed to location-based applications such as friend finders, local search web sites, fleet management systems and E911 services.

SUMMARY

The invention provides methods and systems for estimating position using WLAN (e.g., Wi-Fi) access point radio propagation characteristics in a WLAN location based service.

Aspects of the invention classifying WLAN access points based on a radio channel model can use any channel model, and the invention is independent of any specific channel model.

Under one aspect of the invention, a location-based services system has a plurality of Wi-Fi access points in a target area. The Wi-Fi access points are positioned at geographic locations and have signal coverage areas. A method of characterizing at least one of the Wi-Fi access points comprises determining the geographic location of the Wi-Fi access point, dividing the signal coverage area of the Wi-Fi access point into at least one section, and determining radio propagation characteristics for each section. The radio propagation characteristics of each section characterize a radio channel of the Wi-Fi access point, and the characterization can be used in a location algorithm.

Under another aspect of the invention, the signal coverage area is characterized as one section.

Under another aspect of the invention, the signal coverage is divided into more than one section. Under certain embodiments, radials emanating outward from the Wi-Fi access point form the sections. Under further embodiments, sections are formed based on a distance from the Wi-Fi access point. Under yet further embodiments, sections are formed based on both radials and distances from the Wi-Fi access point.

Under another aspect of the invention, a plurality of received signal power values within the signal coverage area is measured. Each received signal power value is measured at an associated position relative to the Wi-Fi access point. The sections are determined based on the plurality of received signal power values and associated positions.

Under another aspect of the invention, the radio propagation characteristics include a signal power-distance gradient.

Under another aspect of the invention, the signal power-distance gradient for each section is determined by measuring a plurality of received signal power values within the signal coverage area, each received signal power value being measured at an associated position relative to the Wi-Fi access point, performing a linear regression on the plurality of received signal power values and associated positions, and using a slope determined by the linear regression to calculate the signal power-distance gradient.

Under another aspect of the invention, the signal power-distance gradient for each section is determined by measuring a plurality of received signal power values within the signal coverage area, each received signal power value being measured at an associated position relative to the Wi-Fi access point. A distance corresponding to each of the signal power values is calculated, the distances being measured from the associated positions of the signal power values to the geographic locations of the Wi-Fi access points. An average radius of signal coverage is estimated using the standard deviation of the distances, and the average radius of signal coverage is used to calculate the signal power-distance gradient.

Under another aspect of the invention, the position of a Wi-Fi enabled device is estimated by the Wi-Fi enabled device communicating with Wi-Fi access points within range of the Wi-Fi enabled device to cause the Wi-Fi access points to transmit signals. The Wi-Fi enabled device receives the signals transmitted by the Wi-Fi access points and identifies the Wi-Fi access points. Calculated locations and estimated radio propagation characteristics of the Wi-Fi access points are retrieved from a reference database using Wi-Fi access point identifiers. The calculated locations and the estimated radio propagation characteristics are used to estimate the position of the Wi-Fi enabled device.

DETAILED DESCRIPTION

Embodiments of the invention provide a methodology to classify WLAN access points based on their radio propagation characteristics in a WLAN based positioning system and to increase the accuracy of position, velocity and bearing estimations. Under certain embodiments, radio propagation characteristics of WLAN access points are estimated based on RSS samples in their coverage area. For example, radio propagation characteristics can be characterized by finding one or more signal power-distance gradients for at least one of the WLAN access points.

There are different physical phenomena that impact Received Signal Strength (RSS) variation in the dimensions of space and time. The RSS variation is categorized as either fast fading or slow fading. The techniques disclosed herein focus on estimating the slow fading characteristics of the RSS and also assess the estimation quality and quantify the estimation.

Embodiments of the present invention build on techniques, systems and methods disclosed in earlier filed applications, including but not limited to U.S. patent application Ser. No. 11/261,848, entitled Location Beacon Database, U.S. patent application Ser. No. 11/261,898, entitled Server for Updating Location Beacon Database, U.S. patent application Ser. No. 11/261,987, entitled Method and System for Building a Location Beacon Database, and U.S. patent application Ser. No. 11/261,988, entitled Location-Based Services that Choose Location Algorithms Based on Number of Detected Access Points Within Range of User Device, all filed on Oct. 28, 2005, the contents of which are hereby incorporated by reference in its entirety. Those applications taught specific ways to gather high quality location data for Wi-Fi access points so that such data may be used in location based services to determine the geographic position of a Wi-Fi-enabled device utilizing such services and techniques of using said location data to estimate the position of a system user. The present techniques, however, are not limited to systems and methods disclosed in the incorporated patent applications. Thus, while reference to such systems and applications may be helpful, it is not believed necessary to understand the present embodiments or inventions.

Figure 1:
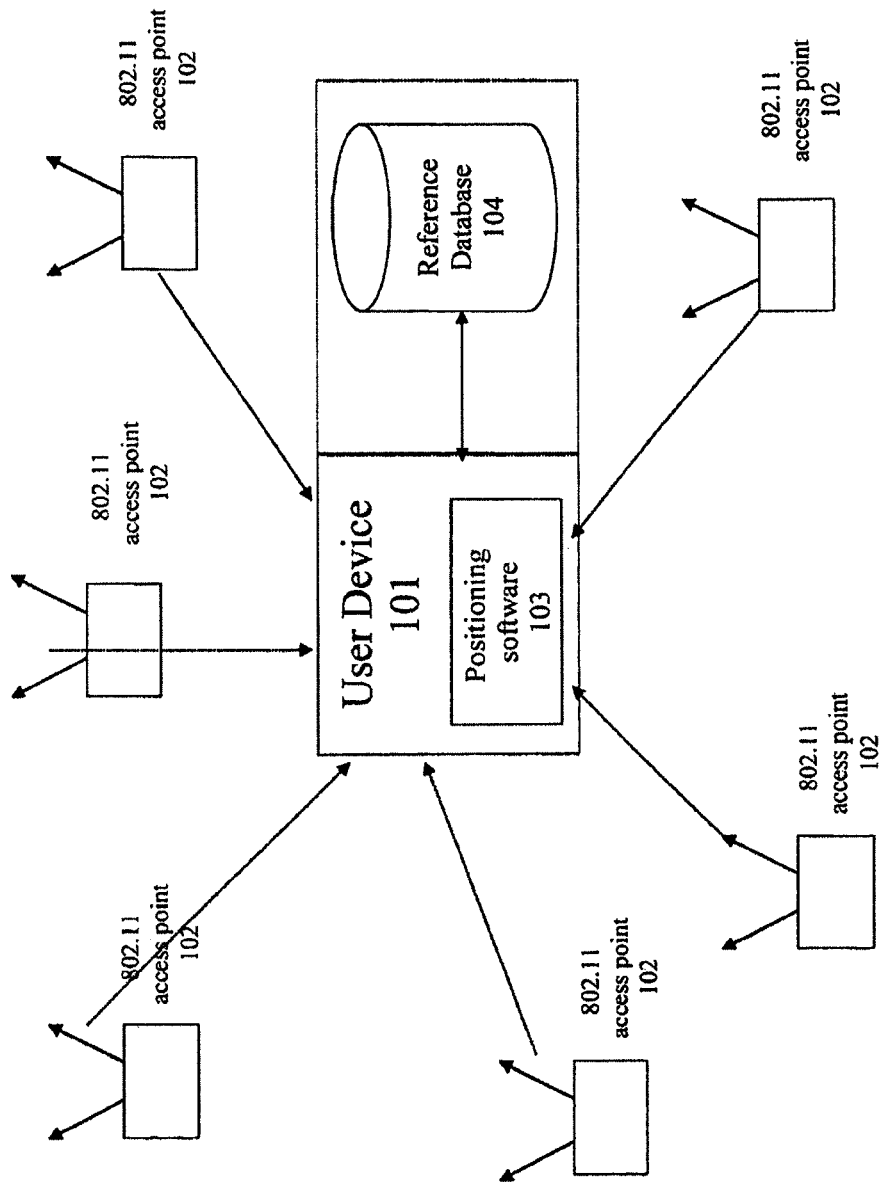
FIG. 1 depicts certain embodiments of a Wi-Fi positioning system.
Figure 2:
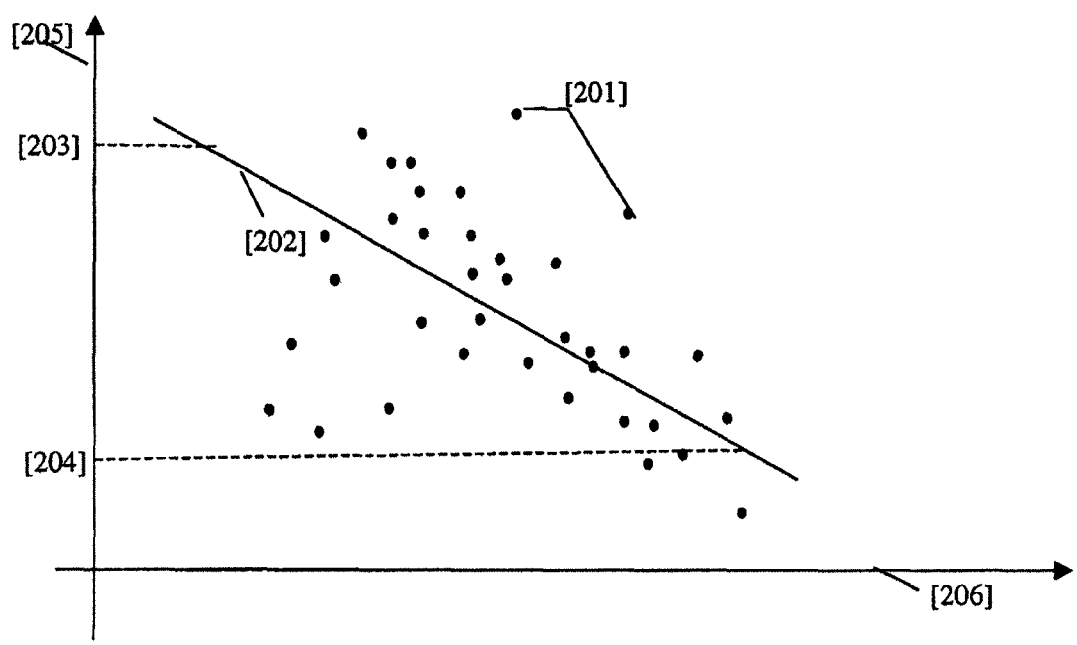
FIG. 2 depicts a line fit to RSS samples, defining an example access point coverage area according to certain embodiments of the invention.

FIG. 2 depicts an example of embodiments of the invention characterizing radio propagation characteristics of WLAN access points by estimating a signal power-distance gradient for a WLAN access point in a WLAN based positioning system. The coverage area of a WLAN access point may be used to find a signal power-distance gradient. The minimum RSS [204] is limited by sensitivity of the scanner. Whereas, the maximum RSS [203] may be assumed the same for all of the WLAN access points because the maximum transmit power is defined as part of the Wi-Fi standard. Therefore, the coverage area of a WLAN access point is directly a function of the signal power-distance gradient of the WLAN access point.

FIG. 2 represents RSS samples [201] as points on a graph plotting RSS power (in dB) versus distance of the RSS sample from the access point (in dB) [206]. A signal power-distance gradient α can be determined by fitting a line [202] to the RSS sample points [201], where the slope of the line is equal to the signal power-distance gradient. Because a WLAN based positioning system according to embodiments of the invention use radio waves of public and private WLAN access points in order to continuously estimate position of a user, aspects of the invention increase the accuracy of location estimation by using individual radio propagation characteristics of each WLAN access point, rather than a standard value.

Under other embodiments of the present invention, the coverage area of a WLAN access point is divided into sectors, and radio propagation characteristics are determined for each sector, e.g., a signal power-distance gradient is found for each sector. For example, in a metropolitan area, the radio propagation characteristics of an access point is not symmetric across its coverage area, i.e., the characteristics vary in different directions. Under embodiments of the invention, the 360 degree coverage area of the WLAN access point is divided into multiple sectors when coverage of the WLAN access point is not symmetric in all of the directions. The sectors may be divided according to radials emanating from the estimated location of the WLAN access point.

For simplicity, the sectors may be referenced from the same axis, for example, the north direction. Because the radio propagation characteristics of the WLAN access point needs to be found in each direction, there is a need to have enough RSS samples in each sector. Based on the statistics of the number of RSS power samples and their distribution, a number of sectors can be determined. Increasing the number of sectors increases the resolution of the radio propagation characteristics because averaging is occurred in a smaller sector. However, this is conditioned on having enough RSS samples to be able to estimate the radio propagation characteristics, e.g., power distance gradient, in each sector accurately.

Figure 3:
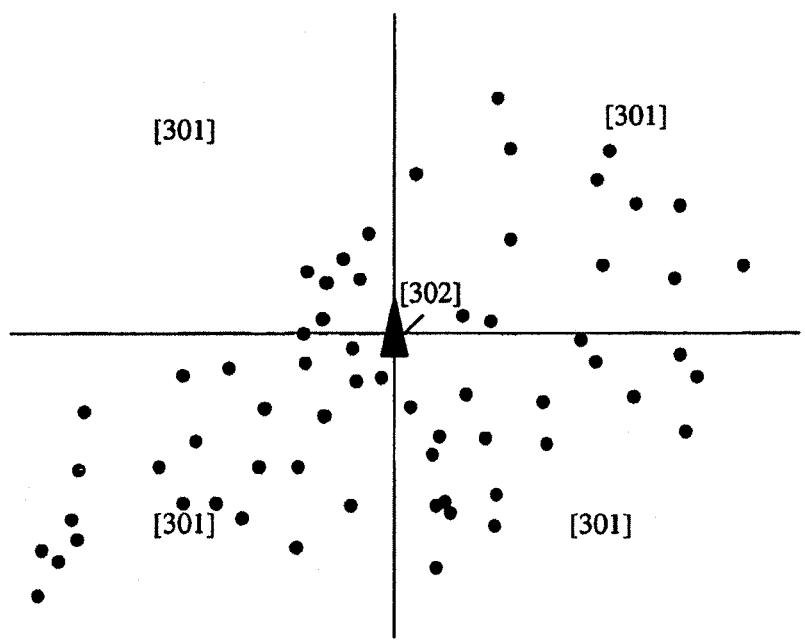
FIG. 3 depicts dividing a coverage area of an access point into sectors according to certain embodiments of the invention.

FIG. 3 depicts an example of a WLAN access point [302] with its coverage area divided into four sectors [301]. The number of sectors varies from one WLAN access point to another, and it is selected for each WLAN access point separately based on the number of RSS samples and the RSS sample distribution in the WLAN access point coverage area. For example, in a metropolitan WLAN based positioning system, if the RSS samples for a given WLAN access point are non-uniform, then a relatively low number of sectors will be used for that WLAN access point. If RSS samples from the coverage area of a WLAN access point indicate different radio propagation characteristics, such as different signal power-distance gradients, in different directions, the coverage area of that WLAN access point is divided into multiple sectors.

For example, if a WLAN access point is facing an open area from one side and residential area from the other side, the coverage area can be divided into two sectors, and corresponding radio propagation characteristics may be determined for each sector. In at least one embodiment, for the general case of a metropolitan positioning system, a useful maximum number of sectors is in the range of four to six, because distinguishing between sectors for higher numbers of sectors may be of limited value. The minimum number of sectors can be as small as one, which means, for example, that one signal power-distance gradient is used for the whole coverage area.

After selecting number of sectors, radio propagation characteristics need to be calculated for each sector. Note that if number of RSS samples in one sector is not enough to estimate radio propagation characteristics in that sector, the average of the characteristics of the adjacent sectors may be used.

Under one embodiment of the invention, the radio propagation characteristics of a WLAN access point can be presented by a piecewise linear estimation. This may be accomplished by dividing the coverage area of the WLAN access point into multiple tiers and finding the radio propagation characteristics for each tier. This method can be used to increase the accuracy of RSS power to distance translation, e.g., when a WLAN access point coverage area consists of indoor and outdoor environments. Thus, this approach may be used to capture indoor and outdoor radio propagation characteristics differently by estimating a signal power-distance gradient for each tier.

Figure 4:
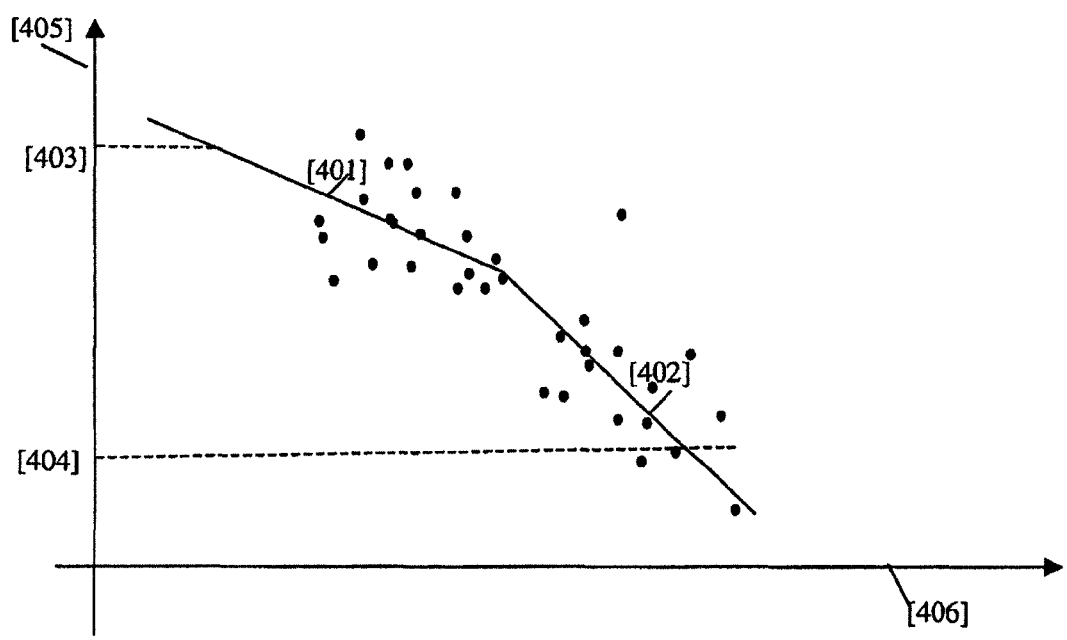
FIG. 4 depicts a coverage area of an access point characterized with multiple power distance gradients according to certain embodiments of the invention.

FIG. 4 depicts an example of RSS samples for a WLAN access point in which the RSS samples can be presented clearly with two signal power-distance gradient values, one for use in the vicinity of the access point and the other for use at greater distances. FIG. 4 present RSS samples plotted as RSS power [405] versus distance [406] from the WLAN access point. The minimum scanner sensitivity [404] and maximum RSS value [403] are also shown. The coverage area of a WLAN access point is divided into multiple tiers when it is necessary. For example, if it is known that the coverage area of a WLAN access point is partly indoor and partly outdoor. Alternatively, the need to use the multi-tier approach to characterize coverage area of a WLAN access point may be detected by observing the RSS samples. A sharp change in the average decay of power values of the RSS samples, as illustrated by the differing slopes of a first cluster of RSS samples [401] and a second cluster of RSS samples [402], may indicate an environment change. A useful number of tiers has been found to be two.

Figure 5:
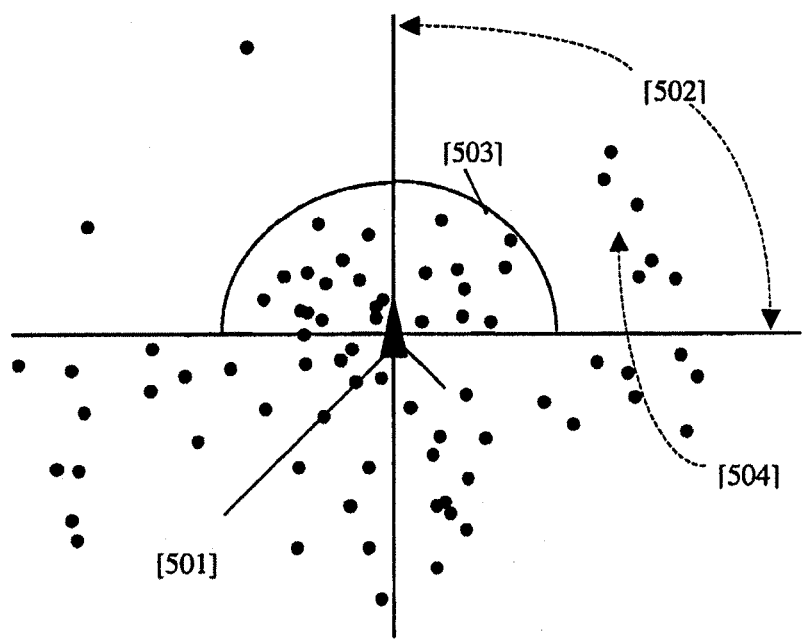
FIG. 5 depicts a coverage area of an access point divided into multiple sectors and tiers according to certain embodiments of the invention.

FIG. 5 depicts an embodiment dividing the coverage area into a combination of sectors and tiers. In this case, the coverage area of a WLAN access point [501] can be divided to multiple sectors [502], and each sector can be further divided into multiple tiers [503], thus forming multiple sections [504]. The number of sectors and tiers, and the corresponding radio propagation characteristics, are considered part of the attributes of each WLAN access point when it is stored in the reference database [104], and these attributes are retrieved by the end user and used to estimate the user location.

Under one embodiment of the invention, the radio propagation characteristics of a WLAN access point may be estimated using the signal power-distance gradient for each sector, which is found based on RSS samples in the designated area. One possible approach to finding a signal power-distance gradient is by fitting a line to RSS samples with power (in dB) as a function of distance (in dB), as was discussed above in connection with FIG. 2. Due to power variation in a metropolitan indoor and outdoor WLAN positioning system, this method may have low accuracy for a typical number of RSS samples in a typical metropolitan environment.

Under one aspect of the invention, a novel approach to finding a signal power-distance gradient is disclosed, wherein the average radius of the coverage area of a WLAN access point is calculated and used to estimate the signal power-distance gradient. The average radius of coverage area can be used as an indictor of the signal power-distance gradient because the signal power-distance gradient is the ratio of RSS power to distance from the WLAN access point. Referring again to FIG. 2, if the points corresponding to the minimum RSS [204] and the maximum RSS [203] are considered, the power difference between the minimum and the maximum power points are the same for all the access points, because the minimum power is bounded by the sensitivity of the scanner and the maximum power is the maximum access point transmit power. The sensitivity of the scanners collecting the RSS samples is nearly identical in the systematic scanning scenario, and the maximum transmit power is limited by, e.g., the FCC, for WLAN access points and can be assumed the same for all the access points. Therefore, the radius of coverage area is directly dependent on the signal power-distance gradient value.

In other words, the sensitivity of the scanner receiver limits the minimum RSS [204] which can be detected by the scanner. Therefore, the signal power-distance gradient value directly impacts the radius of coverage area of the WLAN access point. Because the receiver sensitivity is the same for all scanning devices taking RSS samples, the radius of coverage area of the WLAN access point can be used as an indicator of the value of signal power-distance gradient, as was shown in FIG. 2.

In order to find the radius of coverage area of the WLAN access point and avoid the impact of fast fading on the RSS power reading, and subsequently on the coverage, the standard deviation of the radius of coverage area instead of absolute radius of coverage area is used. In other words, absolute value of the radius of coverage area depends on a limited number of readings at the edge of the coverage, but standard deviation is calculated based on the total number of RSS samples and reduces the impact of power variation at the edge of the coverage area, while at the same time indicating the size of the coverage area.

Figure 6:
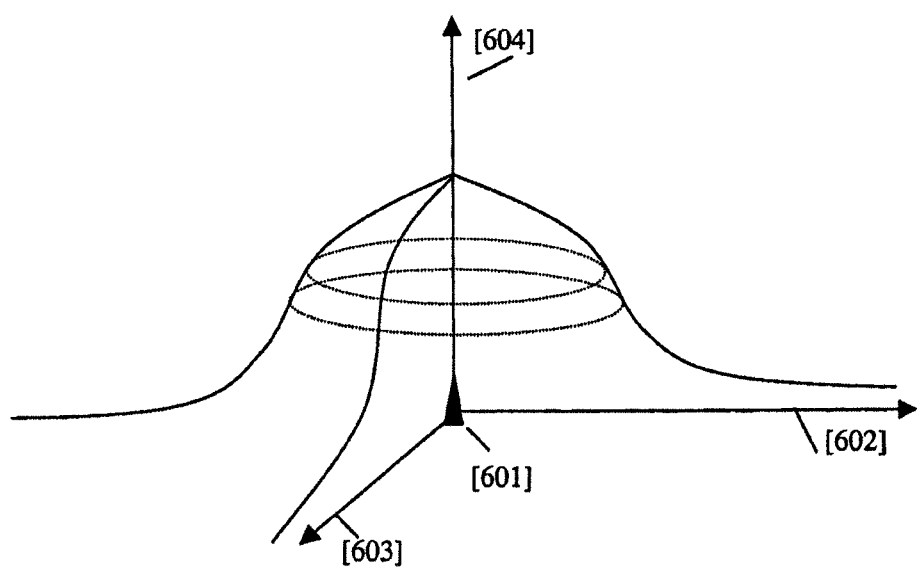
FIG. 6 depicts RSS sample statistics in a two dimensional surface identifying the radius of the coverage area according to certain embodiments of the invention.

FIG. 6 depicts a coverage area of an access point [601] and power distribution [604] as a function of the latitude [602] and longitude [603] of the power readings. The standard deviation of RSS samples referenced to the location of access point [601] is directly correlated to the average radius of the coverage.

When the coverage area is not divided into multiple sections, and the whole area is considered as one area, the standard deviation is calculated based on all of the RSS readings around the access point. If the total number of RSS samples of the access point is denoted by N and corresponding latitude and longitude of RSS sample i are denoted by ($lat_i$, $long_i$), the standard deviation, $\sigma$, of the radius of coverage area is calculated as follows:

$$\sigma = \sqrt{\sigma_x^2 + \sigma_y^2},$$

In which $$\sigma_x^2 = \frac{\sum_{i=1}^{N}(d_{xi})^2}{N-1}, N > 1$$

$$\sigma_x = 0, N = 1,$$

$$\sigma_y^2 = \frac{\sum_{i=1}^{N}(d_{yi})^2}{N-1}, N > 1$$

$$\sigma_y = 0, N = 1,$$

The variables $d_{xi}$ and $d_{yi}$ are the distances of power sample from the WLAN access point in the X and Y directions in Cartesian coordinates. The standard deviation calculation can be simplified as follows:

$$\sigma = \sqrt{\sigma_{lat}^2 + \sigma_{long}^2},$$

In which $$\sigma_{lat}^2 = \frac{\sum_{1}^{N}(lat_i - lat)^2}{N-1}, N > 1$$

$$\sigma_{lat} = 0, N = 1,$$

$$\sigma_{long}^2 = \frac{\sum_{1}^{N}(long_i - long)^2}{N-1}, N > 1$$

$$\sigma_{long} = 0, N = 1,$$

In this equation, (lat, long) is the calculated location of the WLAN access point. The average radius of coverage is calculated based on a Cartesian presentation of location. Calculation of the radius of coverage can also be simplified by considering latitude and longitude without converting them to Cartesian coordinates. If the coverage area is divided into multiple sectors, the standard deviation is calculated based on the distance of RSS samples from the WLAN access point, which can be considered in one dimension. Therefore, the standard deviation is calculated as follows:

$$\sigma = \sqrt{\frac{\sum_{1}^{N}(d_i)^2}{N-1}}, N > 1$$

$$\sigma = 0, N = 1,$$

In which $d_i$ is distance of power sample i from the WLAN access point.

The standard deviation of a radius of the coverage area is translated to the signal power-distance gradient using following equation:

$$\alpha = \alpha_{min}, \text{ if } (\sigma > \sigma_{max})$$

$$\alpha = \alpha_{max}, \text{ if } (\sigma < \sigma_{min})$$

$$\alpha = \alpha_{max} + (\alpha_{min} - \alpha_{max})\left(\frac{\log(\sigma) - \log(\sigma_{min})}{\log(\sigma_{max}) - \log(\sigma_{min})}\right),$$

otherwise.

In which $\alpha_{min}$ and $\alpha_{max}$ are minimum and maximum values of the signal power-distance gradient, and $\sigma_{min}$ and $\sigma_{max}$ are the minimum and maximum thresholds of the WLAN access point coverage. The values of $\alpha_{min}$ and $\alpha_{max}$ are dependent on the environment in which the WLAN devices are operating. One example of useful values for the minimum and maximum signal power-distance gradients for a metropolitan WLAN based positioning systems are as follows:

$$\alpha_{min} = 2,$$

$$\alpha_{max} = 6.$$

In this case, the maximum value of $\alpha$ is the typical maximum value for an urban area.

The minimum and the maximum values of the standard deviation are found based on typical minimum and maximum radii of coverage of WLAN access points, which may be found empirically. Useful minimum and maximum radii of coverage of WLAN APs are 60 and 700 meters, respectively. If the coverage is considered as five-sigma value, the minimum and maximum sigma value can be calculated.

In the case of multi tier approach, after finding the boundary of each tier, the signal power-distance gradient for each tier may be found by fitting a line to RSS samples within each tier using the method discussed in connection with FIG. 2 above. The standard deviation approach cannot be used, because the minimum and maximum power values are not known for each tier, as it was known for the whole coverage area. FIG. 4 depicts an example of a multi-tier access point and illustrates the exact transition point from the first cluster of RSS samples [401] and the second cluster of RSS samples is not known, as some of the RSS samples considered to belong to the first cluster [401] may actually belong to the second cluster [402]. Estimating this transition point introduces error using the standard deviation approach.

According to embodiments of the invention, signal power-distance gradient(s) for each WLAN access point may be used by the user to find its distance to each WLAN access point in range and consequently locate itself. Signal power-distance gradient can be used in the following equation to find the distance:

$$d = \sqrt[\alpha]{\frac{K}{P_{RSS}}}$$

The notation $P_{RSS}$ is the received power from a WLAN access point in watts and K is a constant number aggregating all other parameters. The value of d can be normalized to K by assuming K equal to one without sacrificing accuracy. Assuming K equal to one is the same as changing the scale of the distance measurement, and because it can be made the same for all access points, normalizing K does not impact the accuracy of position estimation.

Under aspects of the invention, the location of access point, (lat, long), may be calculated. If the exact location of an access point is not known, the RSS samples and their corresponding locations can be used to estimate the location of the access point. For example, location of the access point can be found by finding the center of power readings as follows:

$$lat = \frac{\sum_{i=1}^{N} lat_i}{N}$$

$$long = \frac{\sum_{i=1}^{N} long_i}{N}$$

Wherein the total number of power samples is equal to N.

Charactering the unique radio propagation characteristics of each WLAN access point in a location system, instead of using one set of characteristics for all the WLAN access points, increases the accuracy of position, speed of travel, and direction of travel estimations in a WLAN based positioning system. One example of a positioning algorithm is show below, which illustrates the use of signal power-distance gradients estimated according to embodiments of the invention. This example is a triangulation algorithm weighted according to the distance of the user from the access points.

If a user detects N number of access points with a corresponding RSS value of $P_i$, a signal power-distance gradient of $\alpha_i$, a latitude of $lat_i$, and a longitude of $long_i$, the distance of the user to the access points is calculated as follows:

$$d_i = \sqrt[\alpha_i]{\frac{1}{P_i}}$$

Latitude and longitude of the user, $U_{lat}$ and $U_{long}$, can be found as follows:

$$U_{lat} = \frac{\sum_{i=1}^{N} \frac{lat_i}{d_i}}{\sum_{i=1}^{N} \frac{1}{d_i}}$$

$$U_{long} = \frac{\sum_{i=1}^{N} \frac{long_i}{d_i}}{\sum_{i=1}^{N} \frac{1}{d_i}}$$

Under another aspect of the invention, the RSS value reading by the end user can be normalized, and the RSS power reading can be used to select the correct value of radio propagation characteristics, e.g., a signal power-distance gradient, in the case of multi tier approach. When a coverage area is divided into multiple tiers with piecewise linear estimation of the coverage area, the user must be able to determine in which tier he is located, and use the radio propagation characteristics. In this case, there is a need to normalize the RSS power reading across different hardware and different Wi-Fi receiver implementations. In order to normalize the RSS power reading, the minimum and the maximum power sensitivity of the user's device are mapped to the dynamic power range of the scanner used to supply data to the reference database [104].

If the scanners used to supply data to the reference database do not have a standard dynamic power range, the same normalization method may be used to map the individual dynamic ranges of the different scanning devices to a standard dynamic range. Thus, this method can be used in a WLAN positioning system when the hardware differs between scanners. In this case, a standard dynamic range for the power is selected by selecting a minimum and a maximum value for power reading, and all readings from all the different devices are mapped to this range.

For example, if the standard minimum power and the maximum power values are set to −100 dBm and −40 dBm, respectively, and a user device's minimum and maximum range is between −90 dBm and −60 dBm, the power readings of the user is normalized as follows:

$$P_{new} = [P_{old} - (-90)]\left(\frac{-40 - (-100)}{-60 - (-90)}\right) + (-100)$$

It will be appreciated that the scope of the present invention is not limited to the above-described embodiments, but rather is defined by the appended claims, and these claims will encompass modifications of and improvements to what has been described.

What is claimed is:

1. A method of characterizing a wireless local area network (WLAN) access point, comprising:
   receiving a plurality of positions at which signals transmitted by the WLAN access point have been detected;
   estimating a signal coverage area of the WLAN access point based on the plurality of positions at which the signals were detected;
   dividing the estimated signal coverage area of the WLAN access point into at least one section;
   determining radio propagation characteristics of the WLAN access point for each section of the signal coverage area of the WLAN access point based on at least a radius of the estimated signal coverage area or signal strength at the plurality of positions at which the signals were detected; and
   storing the radio propagations characteristics in a reference database of a computing device.

2. The method of claim 1, the dividing the signal coverage area of the WLAN access point into at least one section including dividing the signal coverage area of the WLAN access point into at least two sections, wherein the at least two sections are divided according to at least two radials from the WLAN access point.

3. The method of claim 1, wherein the at least one section is further divided according to at least one distance from the WLAN access point.

4. The method of claim 3, wherein the number of distances is one.

5. The method of claim 1, the dividing the signal coverage area of the WLAN access point into at least one section including dividing the signal coverage area of the WLAN access point into at least two sections, wherein the at least two sections are divided according to at least two radials and at least one distance from the WLAN access point.

6. The method of claim 1, wherein determining the radio propagation characteristics for each section includes determining a signal power-distance gradient for each section.

7. The method of claim 1, further comprising estimating a geographic location of the at least one WLAN access point.

8. The method of claim 1, wherein the receiving the plurality of positions at which signals transmitted by the WLAN access point have been detected includes receiving the transmitted signals.

9. The method of claim 1, further comprising receiving measured power values for the detected signals, wherein the estimating a signal coverage area of the WLAN access point is based only on positions at which signals having a power value above a threshold were detected.

10. The method of claim 1, further comprising:
    selecting a number of sections for the WLAN access point, the number of sections including the at least one section, and
    wherein the dividing divides the estimated signal coverage area of the WLAN access point into the number of sections.

11. The method of claim 10, wherein the number of sections is selected based on a number of, and a distribution of, the plurality of positions at which the signals were detected.

12. A computing device having software stored therein that when executed is operable to:
    receive a plurality of positions at which signals transmitted by a wireless local area network (WLAN) access point have been detected;
    estimate a signal coverage area of the WLAN access point based on the plurality of positions at which the signals were detected;
    divide the estimated signal coverage area of the WLAN access point into two or more sections;
    determine radio propagation characteristics of the WLAN access point for each section based on at least radius of the estimated signal coverage area or signal strength at the plurality of positions at which the signals were detected; and
    store the radio propagations characteristics.

13. The computing device of claim 12, wherein the radio propagation characteristics for each section include a signal power-distance gradient for each section.

14. The computing device of claim 13, wherein the software when executed is further operable to:
    determine the signal power-distance gradient as a function of the radius of the estimated signal coverage area.

15. The computing device of claim 13, wherein the software when executed is further operable to:
  determine the signal power-distance gradient by fitting a line to signal strength samples at the plurality of positions at which the signals were detected.

16. The computing device of claim 12, wherein the two or more sections are defined at least in part by division of the signal coverage area into sectors along two or more radials extending from the WLAN access point.

17. The computing device of claim 12, wherein the two or more sections are defined at least in part by division of the signal coverage area into tiers at one or more distances from the WLAN access point.

18. The computing device of claim 12, wherein the two or more sections are defined at least in part by division of the signal coverage area into sectors along two or more radials extending from the WLAN access point, and by division of the sectors into tiers at one or more distances from the WLAN access point.

19. The computing device of claim 12, wherein the software when executed is further operable to:
  estimate a position of a WLAN-enabled device using the stored radio propagation characteristics.

20. The computing device of claim 19, wherein the software that when executed estimates the position of the WLAN-enabled device utilizes a weighted triangulation algorithm, the weighting determined at least in part based on the stored radio propagation characteristics.

21. The computing device of claim 19, wherein the radio propagation characteristics for each section include a signal power-distance gradient for each section, and the software that when executed estimates the position of the WLAN-enabled device utilizes a weighted triangulation algorithm, the weighting determined at least in part based on signal power-distance gradients.

22. A method of characterizing a wireless local area network (WLAN) access point and using the characterized WLAN access point in WLAN based positioning, comprising:
  receiving a plurality of positions at which signals transmitted by a wireless local area network (WLAN) access point have been detected;
  estimating a signal coverage area of the WLAN access point based on the plurality of positions at which the signals were detected;
  dividing the estimated signal coverage area of the WLAN access point into two or more sections;
  determining radio propagation characteristics of the WLAN access point for each section;
  storing the radio propagations characteristics in a reference database; and
  utilizing at least some of the stored radio propagation characteristics of the WLAN access point from the reference database by positioning software executing on a WLAN-enabled device to estimate a position of the WLAN-enabled device, when the WLAN-enabled device is within range of the WLAN access point.

23. The method of claim 22, wherein the determining is based on at least a radius of the estimated signal coverage area or signal strength at the plurality of positions at which the signals were detected, and the radio propagation characteristics for each section include a signal power-distance gradient for each section calculated using the radius of the estimated signal coverage area or signal strength at the plurality of positions at which the signals were detected.

* * * * *